(No Model.) 7 Sheets—Sheet 1.

J. H. GERRY.
ELECTRICAL TIME SIGNALING APPARATUS.

No. 513,262. Patented Jan. 23, 1894.

Witnesses
Wm H. Courtland
M. V. Bidgood

Inventor
James H. Gerry
by Whitmore Gruner
Attorneys (No Model.) 7 Sheets—Sheet 3.

J. H. GERRY.
ELECTRICAL TIME SIGNALING APPARATUS.

No. 513,262. Patented Jan. 23, 1894.

Fig. 3.

Witnesses
Wm. H. Courtland
M. V. Bidgood

Inventor
James H. Gerry
by Arthur Attorneys (No Model.)

J. H. GERRY.
ELECTRICAL TIME SIGNALING APPARATUS.

No. 513,262. Patented Jan. 23, 1894.

Witnesses
Wm H Courtland
M. V. Bidgood

Inventor
James H. Gerry (No Model.) 7 Sheets—Sheet 5.
J. H. GERRY.
ELECTRICAL TIME SIGNALING APPARATUS.

No. 513,262. Patented Jan. 23, 1894.

Witnesses
Wm H. Courtland
M. V. Bidgood

Inventor
James H. Gerry
by Witmare & Miner
Attorneys (No Model.) 7 Sheets—Sheet 6.

J. H. GERRY.
ELECTRICAL TIME SIGNALING APPARATUS.

No. 513,262. Patented Jan. 23, 1894.

Witnesses
Wm. H. Courtland
M. V. Bidgood

Inventor
James H. Gerry
by Whitmore & Skinner
Attorneys

THE NATIONAL LITHOGRAPHING COMPANY,
WASHINGTON, D. C.

(No Model.)  7 Sheets—Sheet 7.

J. H. GERRY.
ELECTRICAL TIME SIGNALING APPARATUS.

No. 513,262.  Patented Jan. 23, 1894.

Witnesses  
Wm H. Courtland  
M. V. Bidgood

Inventor  
James H. Gerry

UNITED STATES PATENT OFFICE.

JAMES H. GERRY, OF BROOKLYN, ASSIGNOR TO THE SELF WINDING CLOCK COMPANY, OF NEW YORK, N. Y.

ELECTRICAL TIME SIGNALING APPARATUS.

SPECIFICATION forming part of Letters Patent No. 513,262, dated January 23, 1894.

Application filed March 6, 1893. Serial No. 464,826. (No model.)

*To all whom it may concern:*

Be it known that I, JAMES H. GERRY, a citizen of the United States, residing at Brooklyn, county of Kings, and State of New York, have invented certain new and useful Improvements in Time Signaling Apparatus, of which the following is a specification.

This invention relates to means for automatically giving a signal at stated times as for instance, when a train of cars is to leave a depot, and it has for its object to provide means whereby signals can be accurately produced at pre-determined times for each of the working days of a week and a further object is to provide means for automatically causing separate signals to be sent on Sunday where the train-time or the train schedule is different from the week-days.

The invention consists in the novel details of improvement and the combination of parts that will be more fully hereinafter referred to and the novel features pointed out in the claims.

Referring to the accompanying drawings which form a part of this specification:—Figure I is a diagrammatic view of a clock and circuit for my device, also showing a portion of one of the circuit making drums. Fig. II is a view showing in detail the magnets and circuit for actuating the circuit closing drums. Fig. III is a plan view of the instrument partly broken. Fig. IV is a vertical longitudinal section of the instrument. Fig. V is a side view of the same looking from the right in Fig. IV. Fig. VI is a vertical cross section of the instrument. Fig. VII is a developed plan of one of the circuit closing drums. Fig. VIII is a detail side view showing the means for switching the circuit from the week-day to the Sunday drum. Fig. IX is a view corresponding to Fig. I, showing means for giving a warning signal that the train-time is approaching and Fig. X is a developed plan of a portion of a drum to be used with said warning signal.

Figure 1:
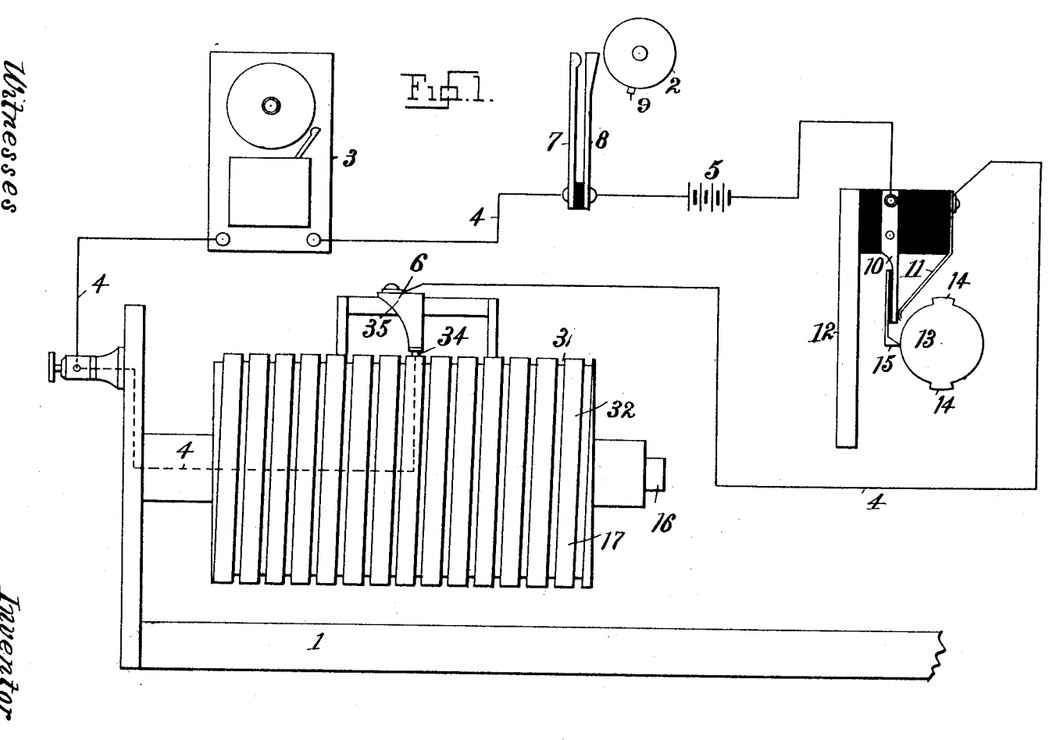
Figure 2:
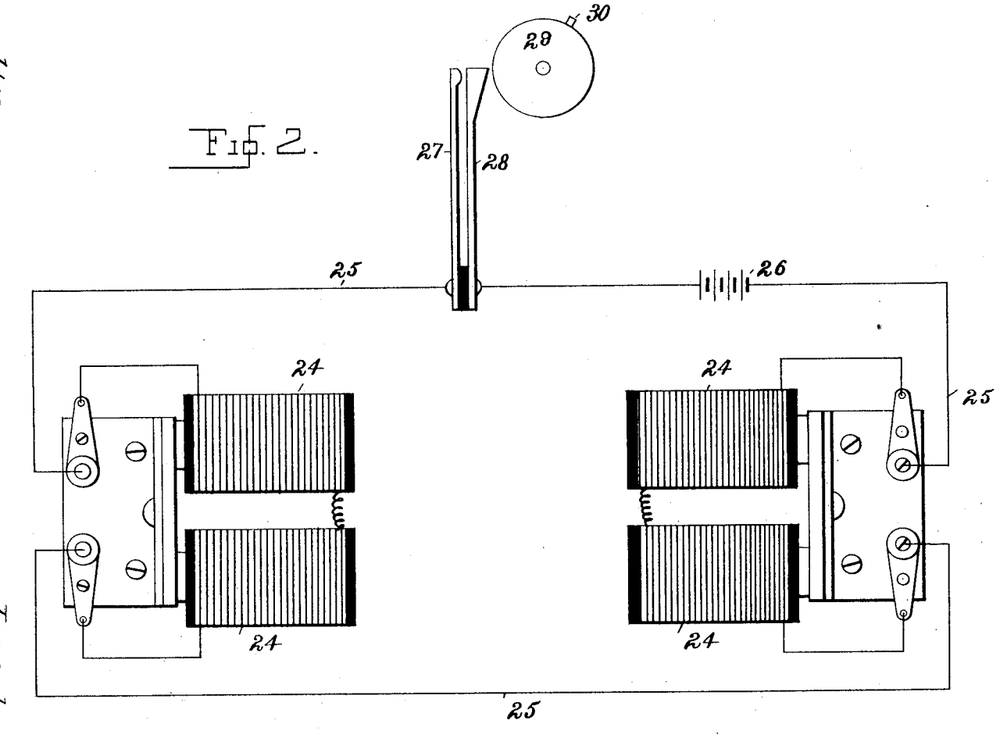
Figure 3:
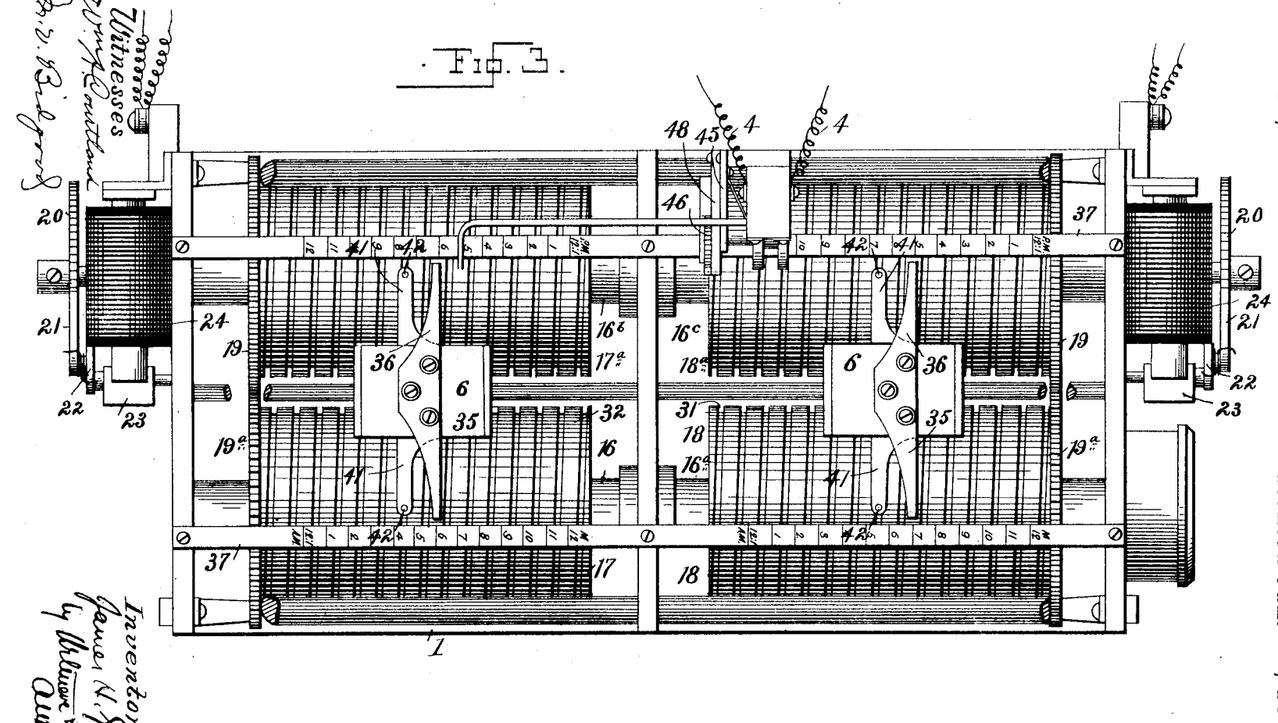
Figure 4:
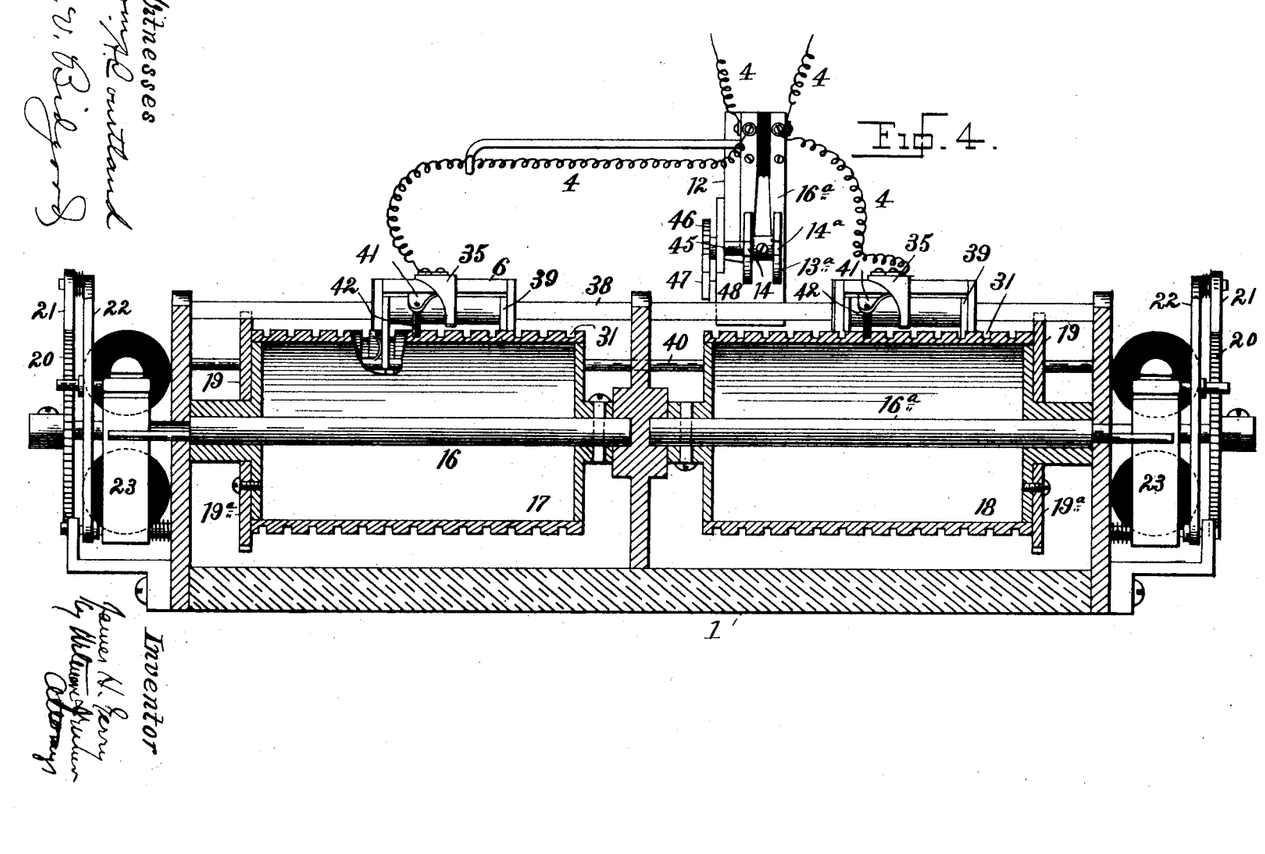
Figure 5:
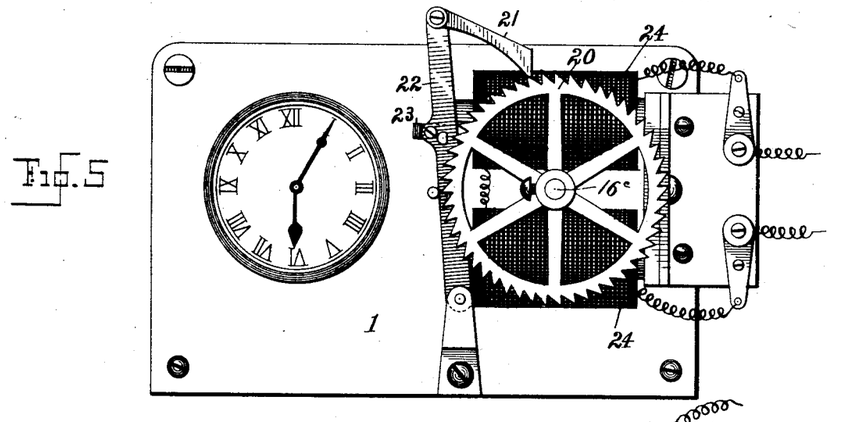
Figure 6:
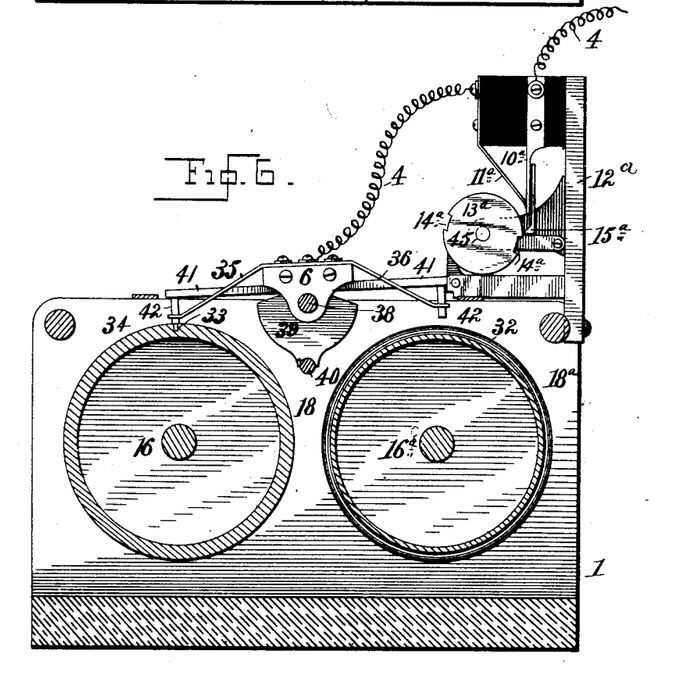
Figure 7:
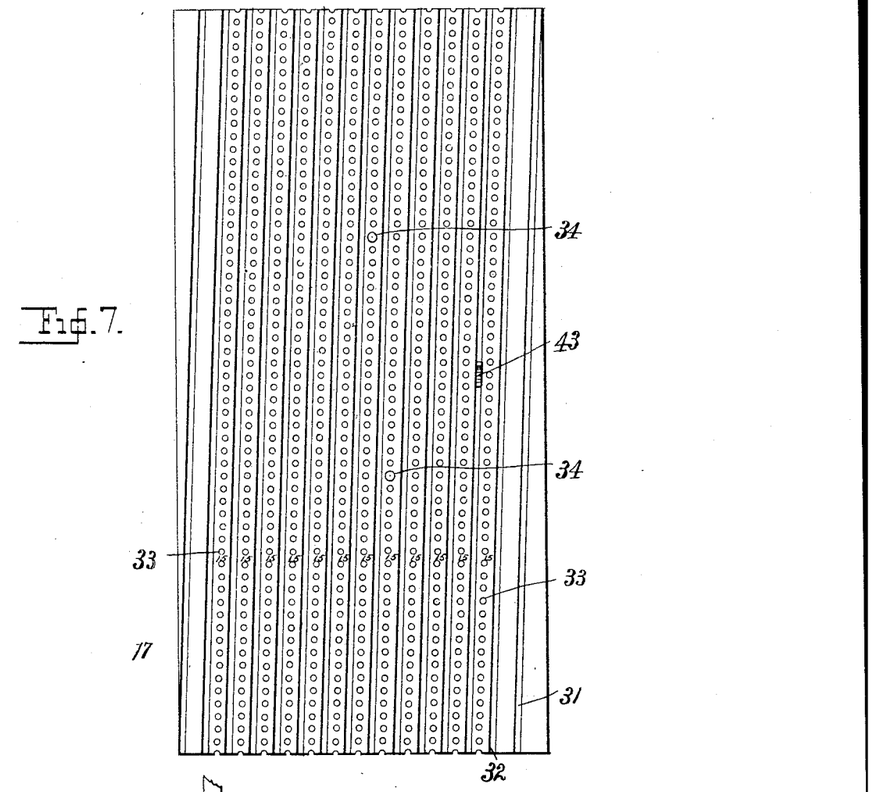
Figure 8:
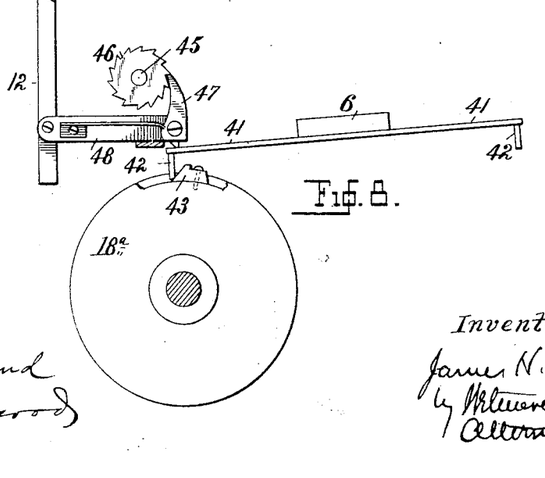
Figure 9:
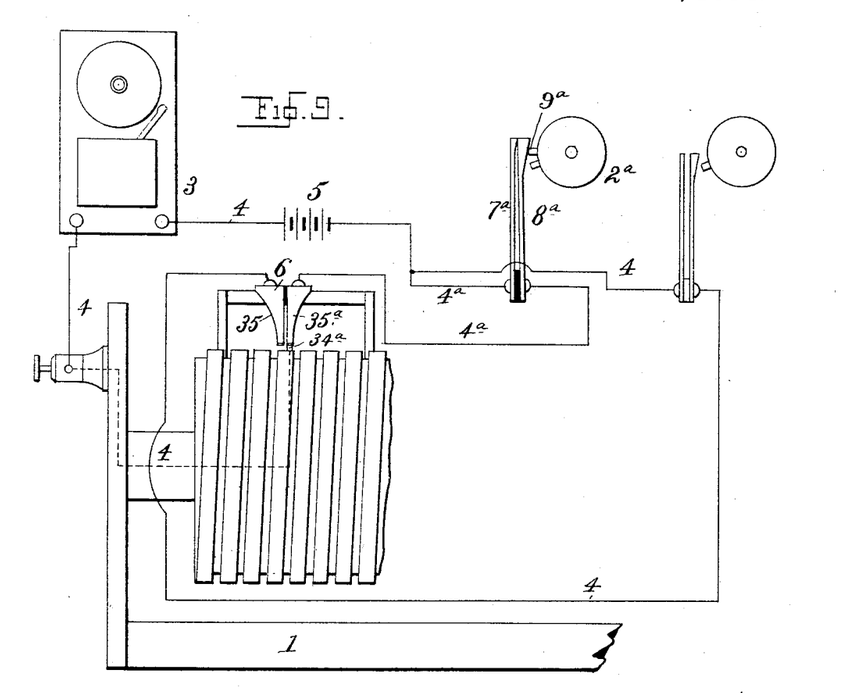
Figure 10:
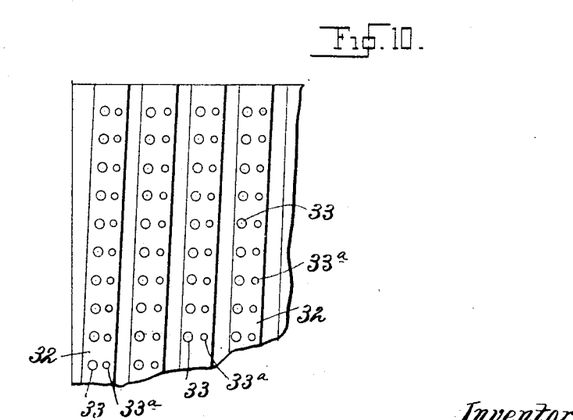

The numeral 1 indicates a suitable frame in which the mechanism of my instrument is located.

2 represents a circuit wheel connected with and driven by a suitable clock mechanism (not shown) and 3 is an electric bell instrument or other suitable signal in circuit with my improved instrument to be actuated as hereinafter explained.

4 is a line wire or circuit extending from the frame 1 to and through the instrument 3 including a battery 5 and back to a frame 6 carried by the instrument 1 as hereinafter more particularly specified.

7, 8 are contact points in the circuit 4 normally out of contact and adapted to be brought together by the wheel 2 or projections 9 thereon to close the circuit through wire 4 to produce a signal. The wheel 2 is turned so that at each minute contact will be made between strips 7 and 8 whereby signals at each or any minute may be accurately produced.

In the circuit 4 are contact strips 10 and 11 shown carried by a standard 12 on frame 1 whereby when said strips are separated the circuit through wire 4 will be broken as hereinafter explained. For this purpose, I have provided a cam or disk 13 having projections 14 adapted to engage an insulated extension 15 or the like, on strip 10 whereby when projection 14 engages strip 15 at the proper time, the circuit through wire 4 at 10, 11 will be broken.

Within the frame 1 are journaled shafts 16, $16^a$, $16^b$, $16^c$ on which are rigidly mounted drums or cylinders 17, $17^a$, 18, $18^a$. The shafts $16^b$, $16^c$ are driven individually and intermittently and carry gear wheels 19 that mesh with corresponding wheels $19^a$ respectively connected with shafts 16 and $16^a$ (or with drums 17—18) whereby said shafts can be turned synchronously. To rotate said shafts, I have shown the shafts $16^b$, $16^c$ each provided with ratchet wheels 20 which receive pawls 21 from levers 22 suitably pivoted upon the frame 1. The levers 22 are connected with armatures 23 of magnets 24 so that when pulsations pass through said magnets, the levers 22 will be reciprocated to intermittently turn the shafts $16^b$, $16^c$ and with them the shafts 16 and $16^a$ correspondingly. The magnets 24 are suitably connected with a circuit 25 containing a battery 26, contact strips 27, 28 normally out of engagement being located in said circuit. (See Fig. II.)

29 is a circuit closer or wheel having a projection 30 to press the contacts 27, 28 together, said circuit closer 29 being rotated by the clock mechanism substantially similar to circuit closer 2 before specified, the relation of movement between the projections 8, 9 of circuit closer 2 and projection 30 of circuit closer 29 being such that the circuit through wire 25 will be closed, say one-half minute later than the circuit through wire 4 so that the drums or cylinders on shafts 16, $16^a$, $16^b$, $16^c$ will be turned while the circuit through wire 4 is broken to allow sufficient time for the circuit to be properly closed through wire 4 to send a signal without danger of interruption. As magnets 24, 24 are located in the same circuit the shafts $16^b$ and $16^c$ will turn simultaneously as well as the connected drums 17—18.

The drums or cylinders 17, $17^a$, 18, $18^a$ are provided on their peripheries with several grooves 31 lying in parallel planes forming between them annular ridges 32. Upon the ridges or projections 32 of the drums or cylinders are arranged a series of apertures 33 in which removable plugs 34 are adapted to be placed, arranged to be engaged by contacts 35 and 36 carried by frame 6. The apertures 33 are arranged consecutively in the orders of the minutes, that is to say, sixty apertures on each projection 32, there being twelve of such projections on each drum or cylinder whereby apertures are provided on each drum corresponding to the minutes contained in a. m. and p. m. For convenience of adjusting the plugs 34 in the desired aperture 33, the ridges 32 may carry numerals to indicate the minutes corresponding to an aperture as seen in Fig. VII.

37 are bars placed across the frame 1 and carrying numerals to indicate the hour on the corresponding projection 32 of the drum beneath as indicated in Fig. III. By this means a person can readily determine in which projection 32 of a drum to place a plug 34 for a corresponding hour. The drums 18 and 17 may correspond to the a. m. hours and the drums 18 and $18^a$ to the p. m. hours, the a. m. and p. m. being correspondingly marked upon bars 37 as indicated. The drums 17, $17^a$, 18, $18^a$ are arranged in pairs to coact together, as shown in Fig. III.

It will be observed that the grooves 31 are arranged helically upon the drums by which means the frames 6 are caused to travel longitudinally of said drums. The frames 6 are carried by suitable guides over said drums, in the drawings being shown mounted on rod 38 carried by the frame 1 in such manner that they can be turned to bring strips 35 or 36 in position to be engaged by plugs 34 on the opposite drums as will be understood from Fig. VI. For the purpose of conveniently and firmly supporting said frame 6 while permitting of the above mentioned movement upon rod 38, I have provided a suitable frame 39 mounted upon rod 38 and freely sliding thereon being guided at its lower part by rod 40 carried by the frame 1. By this means, the frame 6 is securely held while permitting longitudinal and oscillating motion. The frames 6 carry arms 41 having projections 42 adapted to enter the grooves 31 in drums 17, $17^a$, 18, $18^a$. By this means, when a projection 42 passes into a groove 31 in one of the drums, the rotation of said drum will thereby cause the frame 6 to be moved longitudinally of the drum at a speed proportioned to the rotation of the drum. The drums, and thereby the plugs 34 carried by them, are in electrical connection with the line wire 4 as indicated by dotted lines in Fig. I whereby when an arm 35 or 36 engages a plug 34, the circuit through wire 4 will be closed at that point and when the strips 7 and 8 are brought together by circuit closer 2 the circuit will be fully established through strips 7 and 8 whereby a signal in the instrument 3 will be sounded corresponding to the projections 9 on the circuit closer 2.

If it is desired to have a signal sent, say at 12.30 a. m. a plug 34 will be placed in an aperture 33 in drum 17 corresponding to said time whereupon when the arm 35 engages said plug, the circuit will be closed at that point so that when circuit closer 2 presses strips 7 and 8 together, the circuit will be complete and the signal produced.

From the foregoing, it will be understood that plugs 34 can be placed in apertures 33 corresponding to any number of minutes at which signals are desired to be sent and as the drums rotate continuously, the corresponding plugs 34 will be successively brought into contact with arm 35 at the desired moments to automatically close the circuit and send the signal. After a certain hour, say, twelve o'clock has arrived, the arm 35 is to be released from possible engagement with plugs 34 carried by drums 17 and arm 36 turned into such position as to engage corresponding plugs 34 on drum $17^a$ so that for the next twelve hours signals will be sent from the latter drum. This shifting of the circuit from drum 17 to $17^a$ is permitted by the oscillation of frames 6, and for this purpose, each drum carries an eccentric or inclined block 43 preferably adjustable (see Fig. VIII) which at a predetermined moment will rotate under the projection 42 of arm 41 and lift it out of its groove 31 in the drum thereby oscillating frame 6 and causing the projection 42 on the opposite side to pass into a groove 31 on the next drum, whereby for the next twelve hours, the circuit will be sent through the latter drum. It will be understood that each drum is provided with a suitable lifting or switching block 43 whose upper edge extends beyond the periphery of the drum and set in such position that at the end of a space of time, say twelve hours, the strips 35 36 will be shifted from one drum to another successively. By the foregoing means, the frame 6 is caused to travel to and fro longitudinally of the drums automatically returning at the end of each twelve hours whereby no attention is needed to cause the proper signals to be sent for a. m. or p. m.

The drums 17, 17ª may be used for the week-days and 18, 18ª for Sunday, each having its corresponding frame 6 and connected parts, each of said frames being in electrical connection with line wire 4 in suitable manner and in order to automatically shift the circuit from one pair of drums to the other to change the signals from the week-day to the Sunday schedule (when the latter schedule is different from the week-day schedule), the parts numbered 10, 11, 12, 13, 14 and 15 heretofore referred to are used in conjunction with substantially corresponding parts 10ª, 11ª, 12ª, 13ª, 14ª and 15ª. (See Figs. IV and VI.) The circuit make and break disks 13, 13ª are mounted upon a shaft 45 suitably carried in bearings on the standard 12 of frame 1. Upon the shaft 45 is mounted a ratchet wheel 46 adapted to be engaged by pawl 47 carried by a lever 48 pivotally carried by the frame, say, by the standard 12, in such position that one arm 41 of a frame 6 can be brought under it, and when the incline block 43 reaches said arm and lifts it to turn the wheel 46, shaft 45 and the circuit closers 13, 13ª, as will be clearly understood by reference to Fig. VIII. The arrangement of the circuits and parts at this point is such that when a recess 14ª of the circuit closer 13ª is in line with the extension 15ª, the strips 10 and 11 will be in contact, thus closing the circuit normally through the drums 17 and 17ª. But when a certain hour has been reached, say twelve o'clock p. m. Saturday night, the circuit closers 13, 13ª will have been turned a distance sufficient to bring a projection 14 of circuit closer 13 against extension 15 which will move strips 10 and 11 apart thus breaking the circuit of the week-day drums. At the same time recess 14ª of circuit closer 13ª will be in line with extension 15ª whereupon strips 10ª and 11ª will be brought in contact and thus the circuit will be shunted from drums 17, 17ª to 18, 18ª so that the circuit through the instrument 3 can be sent from the latter drums. When the next appropriate hour has arrived, a block 43 will again actuate pawl 47 and wheel 46 and thus give the shaft 45 a sufficient turn to carry recess 14ª away from extension 15ª and projection 14 from extension 15 to again permit the circuit to be closed through the week-day drums, say, 17, 17ª.

It will be understood that at the end of each day (or other appropriate hour) the circuit closers 13, 13ª will be turned a certain distance which multiplied by six turns for six days will produce sufficient rotation to cause the circuit to be shifted at the desired time, say, twelve p. m. Saturday night and when the circuit is again shifted back to drum 17, 17ª at twelve p. m. Sunday night, the said drums will continue closing the circuit throughout the rest of the week It will be understood that I do not intend to confine myself to the days and hours mentioned as I merely specify them as a convenient means of describing the various operations of shifting the current to send different series of pre-arranged signals at the desired moment.

As the drums 17, 17ª (also 18, 18ª) revolve in opposite directions the frame 6 will be caused to travel along one drum in one direction and the other drum in opposite direction, but the drums can be otherwise suitably turned for this purpose.

Where in this specification I use the term "contact plugs" I do so for facility, but I wish it understood that I do not limit myself to "plugs" as any desired form of contact may be used.

In some cases it may be desirable to give a warning signal shortly prior to the signal for the departure of the train. I have therefore shown in Figs. IX and X an arrangement for this purpose, and in the illustration have utilized a portion of the circuit 4 and the bell mechanism 3. To the circuit 4, I have connected a wire 4ª that leads to a contact or strip 35ª, on frame 6, but insulated from strip 35. The strips 35 and 35ª may substantially correspond in construction. In the line or wire 4ª are located contacts 7ª, 8ª (substantially corresponding to contacts 7 and 8) adapted or be brought together by a circuit closer, to make and break device 2ª, having projection 9ª. The circuit closer 2ª may correspond substantially to the circuit closer 2 and it is preferably carried on the same arbor as circuit closer 2 and moved synchronously therewith. The circuit closers 2 and 2ª are preferably arranged to give different signals or taps of the bell, that is to say, the circuit closer 2 may give a single signal (it being shown as having one projection 9 for this purpose) while the circuit closer 2ª may give two signals or taps (it being shown provided with two projections 9ª). The projections 9 and 9ª in the respective circuit closers 2 and 2ª may be arranged one in advance of the other, so as to insure the prior sending of the warning signal. The drums 17, 17ª, 18 and 18ª will, in this case, be provided with a row of apertures 33ª on ridges 32 (corresponding to apertures 33) to receive plugs or contacts 34ª (corresponding to 34) to engage contacts 35ª to close the circuit through 4, 4ª—the apertures 33 and 33ª being arranged in pairs, that is to say, two apertures for each minute.

In adjusting the plugs 34, 34ª on the drums, a plug 34ª will be placed in an aperture 33ª in advance of the plug 34 that is to send the desired signal, say in apertures one, two or three minutes space in advance of the aperture 33 corresponding to the desired train-starting signal. With this arrangement, when the warning signal circuit is closed it will be as follows:—from 4, through 4ª, 7ª, 8ª, 35ª, 34ª, the drum and back to 4 including the bell and battery. Of course, the movements of contacts 35ª will correspond to contacts 35.

Although I have shown the warning signal circuit included in part of the train-starting signal circuit it may be otherwise arranged as found most desirable.

Having thus described my invention, the following is what I claim as new therein and desire to secure by Letters Patent:

1. In a time signaling apparatus a pair of rotative drums adapted to receive adjustable contact plugs in different positions, combined with contacts to engage said plugs, means for shifting said contacts from one drum to the other and means for propelling said contacts along said drums, substantially as described.

2. In a time signaling apparatus a pair of rotative drums adapted to receive contact plugs in different positions, combined with contacts to engage said plugs, means for shifting said contacts from one drum to the other, and means between said drums and contacts for propelling the latter by the former, as specified.

3. In a time signaling apparatus a pair of rotative drums adapted to receive contact plugs in different positions, combined with contacts to engage said plugs, means for moving said contacts along said drums, and means carried by said drums for shifting said contacts from one drum to the other, substantially as described.

4. In a time signaling apparatus two rotative drums adapted to receive contact plugs in different positions, combined with contacts to engage said plugs, means between said contacts and said drums for moving the former by the latter, and circuit changers arranged to shift the circuit from one drum to the other at a predetermined moment, substantially as described.

5. In a time signaling apparatus two rotative drums adapted to receive contact plugs in different positions, combined with contacts to travel along said drums, means between said contacts and said drums for moving the former by the latter, circuit changers arranged to shift the current from one contact to the other, and means connected with one of said contacts for operating said circuit changers, as and for the purpose specified.

6. In a time signaling apparatus, a rotative drum having a helical groove and corresponding helical ridge 32, provided with apertures to receive contact plugs, combined with a contact to travel along said drum and a projection connected therewith and entering said groove in said drum whereby said contact will be moved along the drum, by the latter as it rotates, substantially as described.

7. In a time signaling apparatus a rotative drum having a helical groove, and corresponding helical ridge 32 having apertures to receive contact plugs combined with a frame supported to travel along said drum, a contact carried by said frame to engage said plugs, and a projection carried by said frame and entering said groove in said drum whereby said frame is moved along the drum as it rotates, substantially as described.

8. In a signaling apparatus a pair of drums 17, 17a moving uniformly and each having a helical groove and a corresponding ridge 32 having apertures to receive contact plugs, combined with contacts 35, 36, adapted to alternately engage plugs on said drums, projections connected with said contacts and entering said grooves alternately, to move said contacts along said drums alternately in opposite directions and with means for actuating said contacts to engage the plugs on either drum alternately, substantially as described.

9. In a signaling apparatus the combination of a pair of rotative drums having helical grooves and corresponding ridges adapted to receive adjustable contact plugs, with contacts 35, 36 projections connected with said contacts to enter said grooves to move said contacts along the drums, and an inclined block or cam to engage said projections to shift said contact from one drum to the other, substantially as described.

10. In a signaling apparatus the combination of a rotative drum having a helical groove and a helical ridge 32 having apertures to receive contact plugs with a frame 6 carrying a contact to engage said plugs, a rod carrying said frame, another frame 39 on said rod and engaging a steadying rod 40, the latter frame co-acting with the frame 6 to steady the latter, substantially as described.

11. In a signaling apparatus the combination of a pair of rotative drums having helical grooves, and apertures to receive contact plugs with a frame 6, contacts carried thereby to engage said plugs, projections also carried by said frame to enter said grooves and adjustable inclined blocks or cams placed in said grooves in the paths of said projections to lift them to shift said contacts, substantially as described.

12. In a signaling apparatus a rotative drum having apertures arranged in rows and corresponding to minutes of the day and adapted to receive contact plugs combined with a bar lying parallel to said drum and provided with marks indicating the hour of which the apertures aligned with it indicate the fractions of the hour, substantially as described.

13. In a signaling apparatus a rotative drum adapted to receive contact plugs in different positions, a contact to move along said drum to engage said plugs, a line circuit connected with said drum and said contact, a signaling mechanism included in said circuit, contacts in said circuit normally disengaged and a circuit closer to cause said contacts to close while the first mentioned contact engages said plugs to send the desired signal, substantially as described.

14. In a signaling apparatus the combination of a rotative drum adapted to receive pairs of plugs, separate contacts to engage said plugs respectively, line circuits for said contacts and means for closing said circuits independently, substantially as described.

15. In a signaling apparatus the combination of a rotative drum adapted to receive pairs of plugs, separate contacts to engage said plugs and insulated from each other, line circuits for said contacts and synchronously moving circuit closers for closing said circuits at predetermined moments, substantially as described.

16. In a signaling apparatus the combination of a drum adapted to receive pairs of plugs, contacts to engage said plugs, a line circuit 4, for one of said contacts and make and break contacts in said circuit, a circuit $4^a$, extending from the circuit 4 to the other of said contacts, and contacts in said circuit $4^a$, and with circuit closers to close the circuits through said contacts at different predetermined moments, substantially as described.

17. In a signaling apparatus the combination of a drum having pairs of apertures arranged in parallel lines, pairs of plugs to enter said apertures, contacts to engage said plugs and insulated from each other, line circuits for said contacts, contacts in said circuits and circuit closers for said contacts, whereby the circuit can be closed through either of said contacts according to the placing of the plugs in said apertures, substantially as described.

18. In a signaling apparatus, the combination of a drum having two series of contact plugs, separate circuits for said contacts, each circuit having suitable independent contact strips and independent circuit closers for said two circuits, the circuit closer of each circuit having its operative part placed in advance of the operative part of the circuit closer of the other circuit, whereby one circuit closer closes its circuit in advance of the other.

19. In a signaling apparatus a rotative drum adapted to receive contact plugs in different positions, a contact to travel along said drum, a normally open line circuit including said drum and contact, a signaling instrument included in said circuit and a circuit closer for closing said line circuit, combined with an electro-magnet and mechanism operated thereby to turn said drum step by step, a normally open line circuit for said magnet and a circuit closer to close said circuit, said circuit closer being arranged to close their respective circuits at different intervals of time, substantially as described.

JAMES H. GERRY.

Witnesses:
HARRY E. KNIGHT,
R. EMMET DOHERTY.